UNITED STATES PATENT OFFICE.

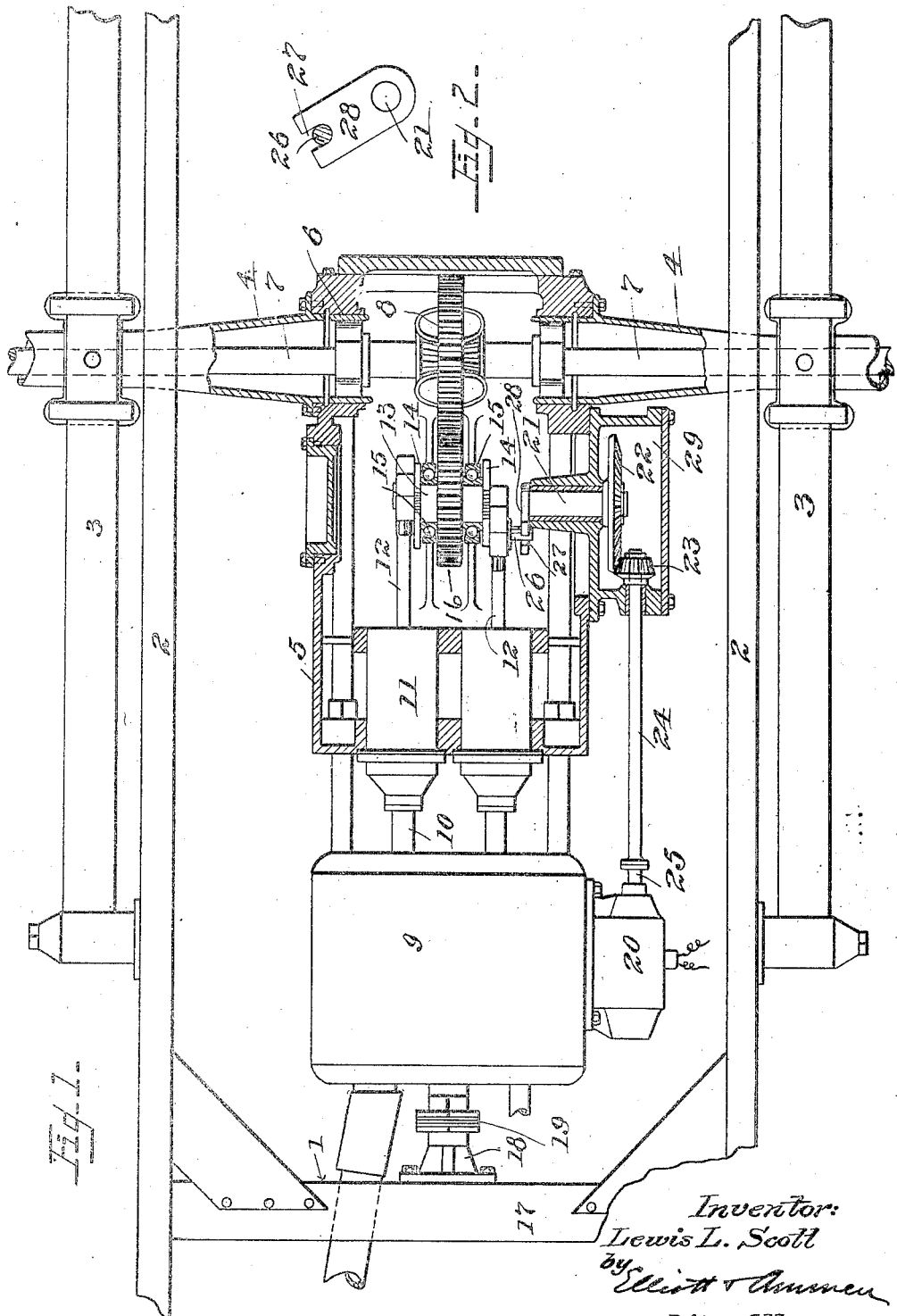

LEWIS L. SCOTT, OF ST. LOUIS, MISSOURI, ASSIGNOR TO STANDARD ENGINEERING COMPANY, OF ST. LOUIS, MISSOURI, A CORPORATION OF MISSOURI.

AUTOMOBILE CONSTRUCTION.

1,358,117.     Specification of Letters Patent.     Patented Nov. 9, 1920.

Application filed December 8, 1919. Serial No. 343,283.

*To all whom it may concern:*

Be it known that I, LEWIS L. SCOTT, a citizen of the United States, residing in the city of St. Louis and State of Missouri, have invented new and useful Improvements in Automobile Construction, of which the following is a specification.

This invention relates to automobile construction, and particularly to the mounting of an accessory, such as an electric generator adapted to be driven from the engine or motor of the automobile.

It has been proposed to support such a generator on the housing of the rear axle and drive the same from the rear side of the differential gear. This arrangement has the objection of increasing the unsprung weights on the axle.

The general object of the present invention is to provide simple means for supporting and driving such an accessory which will avoid any substantial increasing of the unsprung axle load, in other words, the parts are so organized that the generator is driven from the engine though its weight is practically supported on the automobile springs. The invention is described in the following specification as applied to a steam driven automobile.

Further objects of the invention will appear hereinafter.

The invention consists in the general combination of parts to be particularly described hereinafter, all of which contribute to produce a simple and efficient automobile construction. A preferred embodiment of my invention will be described in the following specification, while the broad scope of my invention will be pointed out in the appended claims.

In the drawing,

Figure 1 is a plan and partial section illustrating the general arrangement and organization of the parts; and Fig. 2 is a diagrammatic view in elevation illustrating a detail of the means which I may employ for driving the generator.

Referring particularly to the parts, 1 represents an automobile frame of any desired construction, and comprising side bars 2 which are supported by springs 3 on the rear axle housing; this housing is composed of two tubular housing parts, or housings 4. The engine comprises an engine frame 5 which is supported at its rear end on the axle housing and at its forward end on the frame 1; for this purpose, the rear end of the frame is provided with openings carrying bearings 6 for the axle sections 7 which constitute the rear axle. The adjacent ends of the axle sections 7, carry a differential wheel 8 which is disposed within the engine frame 5. The cylinders of the engine are indicated by the numeral 9, and from the cylinders, piston rods 10 extend into crosshead guides 11 where they are attached to connecting rods 12.

The crank shaft 13 of the engine is disposed parallel with and adjacent to the rear axle, and suitable means is provided for rotatably supporting the crank shaft between the cranks 14 that connect to the rods 12.

For this purpose I provide two inboard bearings 15 located respectively, on opposite sides of a driving gear wheel 16 which meshes with the differential gear wheel 8. The inner ends of the axle housings 4 are bolted to the sides of the engine frame 5, so that the weight of the rear portion of the engine is carried on the axle housing; the forward end of the engine has a point of suspension on the frame 1 for which purpose the cross bar 17 of the frame may be provided with a bracket 18 from which the forward end of the engine is suspended on a laminated strap 19.

In applying my invention to such a construction as I have outlined above, I provide an electric generator and mount it at any suitable point on the engine forward of the rear axle; in this way, part of the weight of the generator will be supported on the frame at the point of suspension 18. I prefer to provide an electric generator 20 which is attached as near as convenient to the point of suspension, that is to say, it is mounted on the side of the engine and toward the end of the engine which is adjacent to the point of suspension. This will place the generator as far as possible from the rear axle, and hence as much as possible of its weight will be supported on the frame; in this way, most of the weight of the generator will be spring-supported.

Any suitable means may be provided for driving the generator, but I prefer to employ inboard bearings, such as described above, because they enable me to employ a very simple and novel driving means for driving the generator. In order to effect the driving of the generator, I simply provide a pin-and-slot connection from one of the cranks to a stub shaft 21 mounted in the side of the engine frame, and operating through bevel gears 22 and 23 to drive a shaft 24 which is coupled to a generator shaft 25. The bevel gear 23 is preferably a pinion, so that the generator shaft will be driven at a considerably higher speed than the engine shaft.

The pin-and-slot connection may be such as that illustrated, comprising a pin 26 carried on the adjacent crank 14 and received in a slot 27 formed in the end of an arm 28 which is rigid on the stub shaft 21. The pin 26 need not fit at all closely in the slot 27, and hence it does not interfere in any way with assembling the parts, for example, the stub shaft 21 and the gears 22 and 23 may be conveniently carried in a gear box 29 which may be bolted in an opening on the side of the engine.

It is understood that the embodiment of the invention herein described is only one of the many embodiments my invention may take, and I do not wish to be limited in the practice of my invention nor in my claims, to the particular embodiment set forth.

What I claim and desire to secure by Letters Patent, is:

1. In an automobile construction, the combination of a frame, a rear axle, a housing therefor, a spring supporting the frame on the axle-housing, an electric generator mounted forward of the axle in a position to be substantially supported through said spring, an engine for driving the rear axle and supported at its forward end on the frame and at its rear end on the axle-housing, and means for driving the generator from the engine.

2. In an automobile construction, the combination of a frame, a rear axle, a housing therefor, a spring supporting the frame on the axle-housing, an electric generator mounted forward of the axle in a position to be substantially supported through said spring, an engine for driving the rear axle and supported at its forward end on the frame and at its rear end on the axle-housing, a differential gear on the rear axle driven by the engine, and means for driving the generator from the engine.

3. In an automobile construction, the combination of a frame, a rear axle-housing, a spring supporting the frame on the axle-housing, a driving axle within the axle-housing, an engine for driving the axle located forward of the axle, supported at its rear end on the axle-housing and at its forward end on the frame, an electric generator carried on the engine forward of the axle whereby the weight of the generator is substantially supported from the automobile frame, and means for driving the generator from the engine.

4. In an automobile construction, the combination of a frame, a rear axle-housing, a spring supporting the frame on the axle-housing, a driving axle within the housing, an engine for driving the axle, located forward of the axle, supported at its rear end on the axle-housing and having a point of suspension on the frame adjacent the forward end of the engine, an electric generator carried on the end of the engine disposed toward the point of suspension whereby the weight of the generator is principally supported from the automobile frame, and means for driving the generator from the engine.

5. In an automobile construction, the combination of a frame, a rear axle-housing, a spring supporting the frame on the axle-housing, a driving axle within the housing, an engine located forward of the axle with its shaft adjacent the driving axle, said engine being supported at its rear end on the axle-housing and having a point of suspension on the frame adjacent the forward end of the engine, said axle carrying a differential wheel for driving the same, said engine having a shaft, a gear wheel carried by the engine shaft and meshing with the differential wheel to drive the axle, cranks on said engine shaft, means for rotatably supporting the engine shaft between said cranks, an electric generator carried on the engine between the axle and said point of suspension, and means for driving the generator from one of the engine cranks.

6. In an automobile construction, the combination of a frame, a rear axle-housing, a spring supporting the frame on the axle-housing, a driving axle within the housing, an engine located forward of the axle with its shaft adjacent the driving axle, said engine being supported at its rear end on the axle-housing and having a point of suspension on the frame adjacent the forward end of the engine, said axle carrying a differential wheel for driving the same, said engine having a shaft, a gear wheel carried by the engine shaft and meshing with the differential wheel to drive the axle, cranks on said engine shaft, means for rotatably supporting the engine shaft between said cranks, an electric generator carried on the engine between the axle and said point of suspension, a stub shaft supported on the engine, means for driving the generator from the stub shaft, said stub shaft having an arm adjacent one of the cranks, and a pin-and-slot connection between that crank and said arm for actuating the stub shaft.

In testimony whereof, I have hereunto set my hand.

LEWIS L. SCOTT.